United States Patent [19]

Leber

[11] 4,316,392

[45] Feb. 23, 1982

[54] FLOWMETER HAVING A ROTARY BODY AND MEANS FOR CALIBRATION

[75] Inventor: Dieter Leber, Eschborn, Fed. Rep. of Germany

[73] Assignee: VDO Adolf Schindling AG, Frankfurt am Main, Fed. Rep. of Germany

[21] Appl. No.: 130,503

[22] Filed: Mar. 14, 1980

[30] Foreign Application Priority Data

Mar. 26, 1979 [DE] Fed. Rep. of Germany ....... 2911827

[51] Int. Cl.³ .................................................. G01F 1/12
[52] U.S. Cl. ................................. 73/861.83; 73/861.92
[58] Field of Search ............. 73/861.83, 861.91, 861.92

[56] References Cited

U.S. PATENT DOCUMENTS 3,000,210  9/1961  Faure-Herman ............... 73/861.83
3,370,465  2/1968  Belle ............................... 73/861.83
3,589,188  6/1971  Belle ............................... 73/861.83

Primary Examiner—Charles A. Ruehl
Attorney, Agent, or Firm—Martin A. Farber

[57] ABSTRACT

A flowmeter having a rotary body which has at least one helical spiral on its outer periphery and which is rotatably supported in a flow channel. A first bearing is arranged upstream of the rotary body and a second bearing is arranged downstream. A first journal is supported freely displaceably in the axial direction in the first bearing and a second journal is fixed in axial direction in the second bearing, the latter being formed as a thrust bearing. The second bearing is adjustable in the direction of flow with self-locking action.

5 Claims, 4 Drawing Figures

FLOWMETER HAVING A ROTARY BODY AND MEANS FOR CALIBRATION

The present invention relates to a flowmeter having a rotary body which has at least one helical spiral on its outer periphery and which is rotatably supported in a flow channel in which under the circumstances a flow rectifier or straightening blade is arranged upstream from the rotary body.

Such flowmeters operate very linearly, particularly at very high rates of flow, i.e. there is good proportionality between the flow through the flow channel and the speed of rotation of the rotary body, which can be converted into a corresponding electrical measurement variable (value). The proportionality factor depends in this connection on the structural parameters of the rotary body, particularly its dimensions, which may be subject to manufacturing tolerances. Furthermore, friction of the bearing may enter into the proportionality factor.

There is the desire to obtain a predetermined relationship between the rate of flow and the speed of rotation of the rotary body, which can be done by electrical means which may be connected to an electric rotary speed indicator which is connected with the rotary body. Such means are, however, relatively expensive, particularly if they are to be accurate.

The object of the present invention is therefore to create the simplest possible means for calibrating a flowmeter having a rotary body, which means do not require any change in the electrical equipment of the measured-value indicator or transducer, but are provided directly on the flowmeter so that the speed of rotation of the rotary body is influenced.

This purpose is aided in accordance with the invention for a flowmeter of the afore-mentioned type in the manner that the flow channel (2) is formed in the region of the enclosed rotary body (7) with inner cross-sections which taper in the direction of flow (arrow 6) and that the rotary body can be displaced in the direction of flow and set in such position.

By this uncomplicated development there are first of all created, in the region of the rotary body, different (average, as seen over the cross section) velocities of flow of the medium, namely, as is known, in the region of the small inside (or open) diameter there is a relatively large velocity of flow. Depending on whether the rotary body is displaced axially more towards the wide or towards the narrow region within this flow channel, a relatively low speed of rotation, or else a higher speed of rotation of the rotary body is obtained or adjusted for a given rate flow.

The desired adjustment can be retained for a long time by the self-locking of the adjustment means.

In particular, the flowmeter of the invention having a first bearing arranged upstream of the rotary body and a second bearing arranged downstream is advantageously constructed with the features that a first journal (11) is supported freely displaceably in the axial direction in the first bearing (10) and a second journal (12) is fixed in axial direction in the second bearing (13), the latter being constructed as a thrust bearing, and that the second bearing (13) is adjustable in the direction of flow with self-locking action.

The first bearing can in this connection be developed in simple manner as a longitudinal slot in which the first journal of the rotary body can turn. The second bearing in its simplest embodiment can be formed as a blind hole in which the second journal abuts under the pressure produced by the flowing fluid. The blind hole is adjustable or settable in axial direction by means of a part which surrounds it.

The blind hole thus forms a thrust bearing which can assume an axial force of the rotary body and within which the rotary body furthermore can turn.

In a first embodiment of the flowmeter it is furthermore advantageously provided that the second bearing (13) which is formed as a thrust bearing is developed as a cylindrical part (19) having an external threading (20) which can be screwed into a threaded hole of a "tripod" (22) which is arranged in fixed position in the flow channel.

The first variation is particularly inexpensive since, instead of a cylindrical part forming an integral one-piece unit with the "tripod", which cylindrical part forms the thrust bearing, this part need only be screwable with a thread within the "tripod."

In a second variation of the flowmeter, the thrust bearing (13) is rigidly arranged in a "tripod" (15), and the "tripod" has outer guide means (a tube with an adjustment pin 17) which engage in a helical guide means (slot 18) in the housing (1) which surrounds the flow channel.

In this case therefore the "tripod" is displaced together with the thrust bearing by being turned in a helical path, the axial adjustment or setting being effected at the same time. The pitch of the helix can be readily selected without anything more to do such that self-locking occurs, that is, that the "tripod" does not shift under the effect of the pressure exerted on the thrust bearing by the rotary body.

Particularly, the second variation furthermore suitably can have the features that a slot (18) of helical shape is provided in the housing (1), through which slot there passes an adjustment pin (17) which is connected with a tube (16), the latter being rotatable in the housing and that the "tripod" (15) is fastened within the tube.

In this embodiment therefore guiding of the "tripod" with the thrust bearing in the housing is effected by the tube, simultaneously also sealing-off of the interior of the flow channel to the slot. The axial displacement of the thrust bearing in the tube is effected by adjustment of the adjustment pin, which is accessible from the outside, and is displaced within the slot, whereby an axial displacement of the thrust bearing also takes place.

From a manufacturing standpoint it is particularly favorable to produce these flowmeters from synthetic material or plastic.

With the above and other objects and advantages in view, the present invention will become more clearly understood in connection with the detailed description of a preferred embodiments, when considered with the accompanying drawing, of which:

Figure 1:
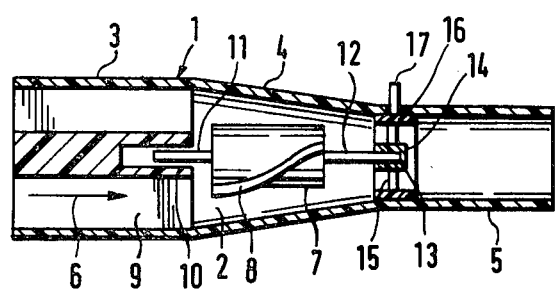
FIG. 1 is a longitudinal cross-section showing a first embodiment of the flowmeter of the invention.

Referring to FIG. 1 of the drawing, a housing wall 1 surrounds and bounds a flow channel 2. The housing wall comprises a cylindrical part 3 of a relatively large diameter which gradually passes or transfers via a conical part 4 into a second cylindrical part 5 of relatively small diameter. In the conical part 4 the inner (or open) cross sections therefore taper down in the direction of flow, which direction of flow is indicated by the arrow 6.

Within this conical part 4 there is arranged a rotary body 7 which has a plurality of helical spirals or ribs, of which spirals only the rib 8 can be noted in FIG. 1.

The rotary body is rotatably supported within the first cylindrical part 3, namely in a so-called flow rectifier or straightener blade 9 which is formed of two walls arranged at right angles to each other, intersecting in the center of the flow channel. The bearing 10 in the flow rectifier acts as a pure rotary or pivot bearing since it is formed as a slot, within which the first journal or shaft pin 11 of the rotary body can displace freely.

The second journal or shaft pin 12 of the rotary body, on the other hand, is supported in a thrust bearing 13 as the second bearing which is developed as a blind hole left open in a cylindrical part 14. The cylindrical part 14 forms an integral one-piece unit with a "tripod" or three leg spacer support 15 through which the fluid can flow. The "tripod" 15 passes or extends into a tube 16, which tube abuts tightly and snugly, yet rotatably, within the cylindrical part 5 of the housing.

Figure 2:
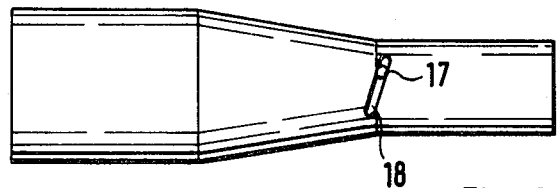
FIG. 2 is a top view of the embodiment of FIG. 1.

Rigidly connected with the tube 16 is an adjustment or setting pin 17 which extends through a helical slot 18 cut in the housing (see FIG. 2).

Depending on the adjustment of the pin 17 in the slot, the thrust bearing 13 is shifted in the axial direction. Accordingly, the rotary body 7 is displaced further toward the part of the flow channel in which the inside diameter is larger and where relatively low velocities of flow prevail, or else to the part which lies to the right in FIG. 1, and in which, with the relatively small inside diameter, relatively large velocities of flow prevail. Thus, by displacing the adjustment pin 17 in the slot 18 the porportionality factor between the flow of the fluid in the flow channel to the speed of rotation of the rotary body 7 can be regulated.

The inclination of the slot 18 with respect to the longitudinal axis of the flow channel is selected such that no automatic or self actuating displacement of the adjustment pin can take place under the pressure acting on the thrust bearing.

Figure 4:
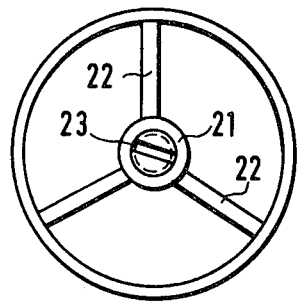
FIG. 4 shows a detail of FIG. 3 in a top plan view from a side opposite the direction of flow.
Figure 3:
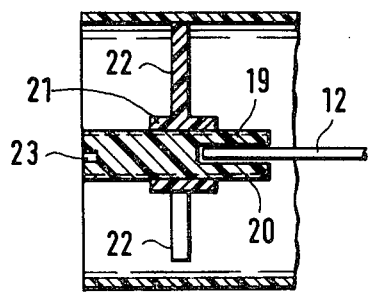
FIG. 3 shows a detail of a second embodiment, namely the adjustable thrust bearing, seen in longitudinal section.

While the embodiment shown in FIGS. 1 and 2 can be adjusted from the outside, the variation shown in FIGS. 3 and 4 provides for the possibility of adjustment inside of the flow channel.

In the embodiment shown in FIGS. 3 and 4, which shows only the region of the thrust bearing at the downstream end of the second journal 12, the flow channel, which as in FIG. 1, is formed with cross sections tapering down in the direction of flow, is turned 180° with respect to the showing of FIG. 1 so that in this case the flow takes place from right to left and the pressure force exerted by the second journal 12 on the thrust bearing accordingly acts to the left.

The variation of the thrust bearing shown in FIGS. 3 and 4 is characterized by the fact that the slot is cut in a cylindrical part 19 which has an external thread 20. The external thread 20 is turnable in or can be screwed in a threaded ring 21 (see FIG. 4) which forms a single unit with the "tripod" 22. The "tripod" 22 in this embodiment is rigidly mounted within the cylindrical housing part 5 of FIG. 1.

The adjustment of the proportionality factor between the flow and the speed of rotation of the rotary body can be effected in the embodiment of FIGS. 3 and 4 in the manner that—with the flow channel open—the cylindrical part 19 is displaced by turning a tool inserted into a slot 23 in the cylindrical part 19 such that when the flow channel is again closed, the desired speed of rotation of the rotary body 8 is obtained for a given quantity of flow.

The embodiment, last shown and described, has the advantage that it is not necessary to fear any accidental misadjustment of the calibration, once effected, due to unintended movement of the adjustment means.

I claim:

1. A flowmeter comprising
    a housing defining a flow channel adapted for flow therethrough,
    a rotary body being formed with at least one helical spiral on its outer periphery and being rotatably supported in said flow channel,
    said housing and said flow channel being formed in a vicinity of said rotary body with inner cross-sections tapering in the direction of flow,
    means for displacing and setting said rotary body in the direction of flow,
    a first bearing arranged upstream of said rotary body and a second bearing arranged downstream of said rotary body constitute means for rotatably supporting said rotary body in said flow channel,
    said rotary body includes,
    a first journal supported freely displaceable in an axial direction in said first bearing, and
    a second journal fixed in the axial direction in said second bearing, said second bearing is developed as a thrust bearing,
    said second bearing is adjustable with self-locking action in the direction of flow and constitutes said displacing and setting means,
    said second bearing is formed as a cylindrical part having an external thread,
    a tripod is arranged fixed to said housing in said flow channel, said tripod is formed with a threaded hole,
    said cylindrical part is screwable into said threaded hole of said tripod.

2. A flowmeter comprising
    a housing defining a flow channel adapted for flow therethrough,
    a rotary body being formed with at least one helical spiral on its outer periphery and being rotatably supported in said flow channel,
    said housing and said flow channel being formed in a vicinity of said rotary body with inner cross-sections tapering in the direction of flow,
    means for displacing and setting said rotary body in the direction of flow,
    a first bearing arranged upstream of said rotary body and a second bearing arranged downstream of said rotary body constitute means for rotatably supporting said rotary body in said flow channel,
    said rotary body includes,
    a first journal supported freely displaceable in an axial direction in said first bearing, and
    a second journal fixed in the axial direction in said second bearing, said second bearing is developed as a thrust bearing,
    said second bearing is adjustable with self-locking action in the direction of flow and constitutes said displacing and setting means,
    said housing has a helical guide means, a tripod has outer guide means for engaging said helical guide means and for shifting said tripod, said thrust bearing is rigidly arranged in said tripod.

3. The flowmeter as set forth in claim 2, wherein said helical guide means constitutes a slot of helical shape formed in said housing, said outer guide means includes a tube and an adjustment pin connected with said tube, said adjustment pin extends through said slot, said tube is rotatably mounted in said housing in said flow channel, said tripod is fastened within said tube.

4. The flowmeter as set forth in claim 2, wherein said tripod, said outer guide means and said thrust bearing are formed in one piece.

5. The flowmeter as set forth in claim 1 or 2, further comprising a flow straightening blade is disposed in said flow channel upstream of said rotary body, said first bearing is formed in said flow straightening blade.

* * * * *